US006782399B2

(12) United States Patent
Mosher, Jr.

(10) Patent No.: US 6,782,399 B2
(45) Date of Patent: Aug. 24, 2004

(54) ULTRA-HIGH SPEED DATABASE REPLICATION WITH MULTIPLE AUDIT LOGS

(75) Inventor: Malcolm Mosher, Jr., Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 09/883,066

(22) Filed: Jun. 15, 2001

(65) Prior Publication Data

US 2002/0194203 A1 Dec. 19, 2002

(51) Int. Cl.[7] .............................................. G06F 17/30
(52) U.S. Cl. ....................... 707/200; 707/202; 707/204
(58) Field of Search .............................. 707/2, 10, 200, 707/202, 204

(56) References Cited

U.S. PATENT DOCUMENTS

| | | | |
|---|---|---|---|
| 5,423,037 A | * 6/1995 | Hvasshovd | .................. 707/202 |
| 5,740,433 A | 4/1998 | Carr et al. | |
| 5,745,753 A | 4/1998 | Mosher | |
| 5,794,252 A | 8/1998 | Bailey et al. | |
| 5,799,322 A | 8/1998 | Mosher, Jr. | |
| 5,799,323 A | * 8/1998 | Mosher et al. | ............... 707/202 |
| 5,813,009 A | * 9/1998 | Johnson et al. | .............. 707/100 |
| 5,835,915 A | 11/1998 | Carr et al. | |
| 5,884,328 A | 3/1999 | Mosher, Jr. | |
| 6,584,477 B1 | * 6/2003 | Mosher | ....................... 707/204 |

OTHER PUBLICATIONS

U.S. patent Ser. No. 09/883,067, filed Jun. 15, 2001, Mosher et al., "System and Method for Purging Database Update Image Files After Completion of Associated Transactions For A Database Replication System With Multiple Audit Logs".
U.S. patent Ser. No.: 09/418,427, filed Oct. 14, 1999, Malcolm Mosher, "High Speed System And Method For Replicating A Large Database At A Remote Location".
U.S. patent Ser. No.: 09/418,425, filed Oct. 14, 1999, Mosher et al., "System and Method for Purging Database Update Image Files After Completion of Associated Transactions".

* cited by examiner

*Primary Examiner*—Safet Metjahic
*Assistant Examiner*—Haythim J. Alaubaidi

(57) ABSTRACT

A method and system for high-speed database replication. Audit update records and audit backout records are generated by the primary system, and are transmitted to the backup system in multiple streams in parallel. The backup system stores the received audit records as audit image trails, and applies the audit updates and audit backouts to the backup database without regard to whether the transactions committed or aborted and without regard to whether the backup system received a complete set of the audit records pertaining to the transactions. Upon the occurrence of a predetermined event, the backup system applies all the audit updates and backouts it received, and subsequently "undoes" questionable audit updates and audit backouts.

16 Claims, 12 Drawing Sheets

ULTRA-HIGH SPEED DATABASE REPLICATION WITH MULTIPLE AUDIT LOGS

RELATED APPLICATIONS

This application is related to, and incorporates by reference, United States patent application entitled "HIGH SPEED SYSTEM AND METHOD FOR REPLICATING A LARGE DATABASE AT A REMOTE LOCATION," filed Oct. 14, 1999 and bearing Ser. No. 09/418,427 now U.S. Pat. No. 6,584,477, and co-pending United States patent application entitled "SYSTEM AND METHOD FOR PURGING DATABASE UPDATE IMAGE FILES AFTER COMPLETION OF ASSOCIATED TRANSACTIONS FOR A DATABASE REPLICATION SYSTEM WITH MULTPLE AUDIT LOGS", filed Jun. 15, 2001, and bearing Ser. No. 09/883,067, now pending.

BRIEF DESCRIPTION OF THE INVENTION

The present invention relates generally to database management systems having a primary database facility and a duplicate or backup database facility. More particularly, the present invention relates to system and method for keeping a backup database in synchronization with a primary database while applications continue to actively modify the primary database.

BACKGROUND OF THE INVENTION

The present invention is an improvement on the "remote data facility" (RDF) technology disclosed in U.S. Pat. Nos. 5,740,433, 5,745,753, 5,794,252, 5,799,322, 5,799,323, 5,835,915, and 5,884,328, all of which are hereby incorporated by reference as background information.

The prior art Tandem RDF technology underwent a number of changes over time to increase the peak number of transactions per second that can be performed on the primary system and replicated on the backup system. The present invention represents a set of new techniques so as to achieve a large increase in the rate at which transactions performed on the primary system can be replicated on the backup system. Some of the techniques used by the present invention violate basic assumptions of the prior art systems, requiring both redesign of prior art mechanisms and some completely new mechanisms, to ensure that the backup system maintains "soft synchronization" with the primary system during normal operation, and to also ensure that the backup system can be brought to an entirely consistent internal state whenever the backup system needs to perform a takeover operation and be used as the primary system.

SUMMARY OF THE INVENTION

In summary, the present invention is a distributed computer database system having a local computer system and a remote computer system. The local computer system has a local database stored on local memory media, application programs that modify the local database, and a transaction manager that stores audit records in multiple local audit trails reflecting those application program modifications to the local database. The transaction manager stores in a particular one of the local audit trails transaction state records indicating the transaction states of the transactions making those database modifications. The valid transaction states of a transaction can be committed, aborted, active, aborting or prepared. The particular local audit trail is referred to as a MAT (master audit trail). The other local audit trails are referred to as AuxATs (auxiliary audit trails). The transaction manager also stores in the MAT a type of records known as Auxiliary Pointer Records, which indicate the range of audit records in the AuxATs that were flushed to disks since the last Auxiliary Pointer Record.

The remote computer system, remotely located from the local computer system, has a backup database stored on remote memory media associated with the remote computer system.

A remote duplicate data facility (RDF) is partially located in the local computer system and partially in the remote computer for maintaining virtual synchronization of the backup database with the local database. The RDF includes multiple Extractor processes that execute on the local computer system, and multiple Receiver processes and multiple Updater processes that execute on the remote computer system. When an RDF system is set up, each audit trail is configured to be associated with one Extractor process, and each Extractor process is configured to be associated with one Receiver process.

A Master Extractor process extracts audit records from the MAT, and each of the Auxiliary Extractor processes extracts auxiliary audit records from one of the AuxATs. The Extractor processes, when extracting audit records from the MAT and the AuxATs, insert an Audit Trail Position (ATPosn) value in each audit record. The Extractor processes then transmit the extracted audit records to the remote computer system.

The Receiver processes receive the extracted audit records from the Extractor processes and distribute the extracted audit records to one or more image trails in the remote computer system. The Master Receiver process receives audit records from the Master Extractor, and each of the Auxiliary Receiver processes receives audit records from an associated Auxiliary Extractor process. The audit records include audit update and audit backout records indicating database updates and database backouts generated by transactions executing on the local computer system. Control-type audit records, which only appear in the MAT, are distributed to a Master Image Trail (MIT). Data-type audit records of the MAT are distributed to MAT-based Secondary Image Trails (SITs). Audit records of the AuxATs are distributed to AuxAT-based SITs. Note that data-type audit records of the MAT or the AuxATs may be distributed to more than one SITs. Each Receiver process is also responsible of storing the ATPosn of the last audit record it received.

For each SIT there is an Updater process that applies to a backup database volume the database updates and backouts indicated by the audit update and audit backout records in the SIT. The audit update and audit backout records are applied to the backup database volume in same order that they are stored in the image trail, without regard to whether corresponding transactions in the local computer system committed or aborted.

Upon the occurrence of a predefined event, such as failure of the local computer system, the Receiver processes complete all processing of previously received audit records. The remote computer system then determines the transactions whose final commit/abort outcomes are unknown. The remote computer system also determines the transactions of which the completeness of their audit records is unknown. Thereafter, the Updater backs out the audit updates of the audit updates and backouts associated with the questionable transactions.

The remote computer system identifies the questionable transactions by examining the MIT and the audit records in the SITs. Specifically, the remote computer system first examines the Auxiliary Pointer Records and the transaction state records in the MIT. Based on information contained in the Auxiliary Pointer Records, transaction state records and the audit records in the SITs, the remote computer system identifies transactions having an unknown final state (e.g., committed or aborted) and/or transactions having a known final state but may be lacking a complete set of audit records. The Updaters then back out of the database updates associated with the identified transactions.

BRIEF DESCRIPTION OF THE DRAWINGS

Additional objects and features of the invention will be more readily apparent from the following detailed description and appended claims when considered in conjunction with the drawings, in which:

DESCRIPTION OF THE PREFERRED EMBODIMENTS

Overview of RDF System

Figure 1A:
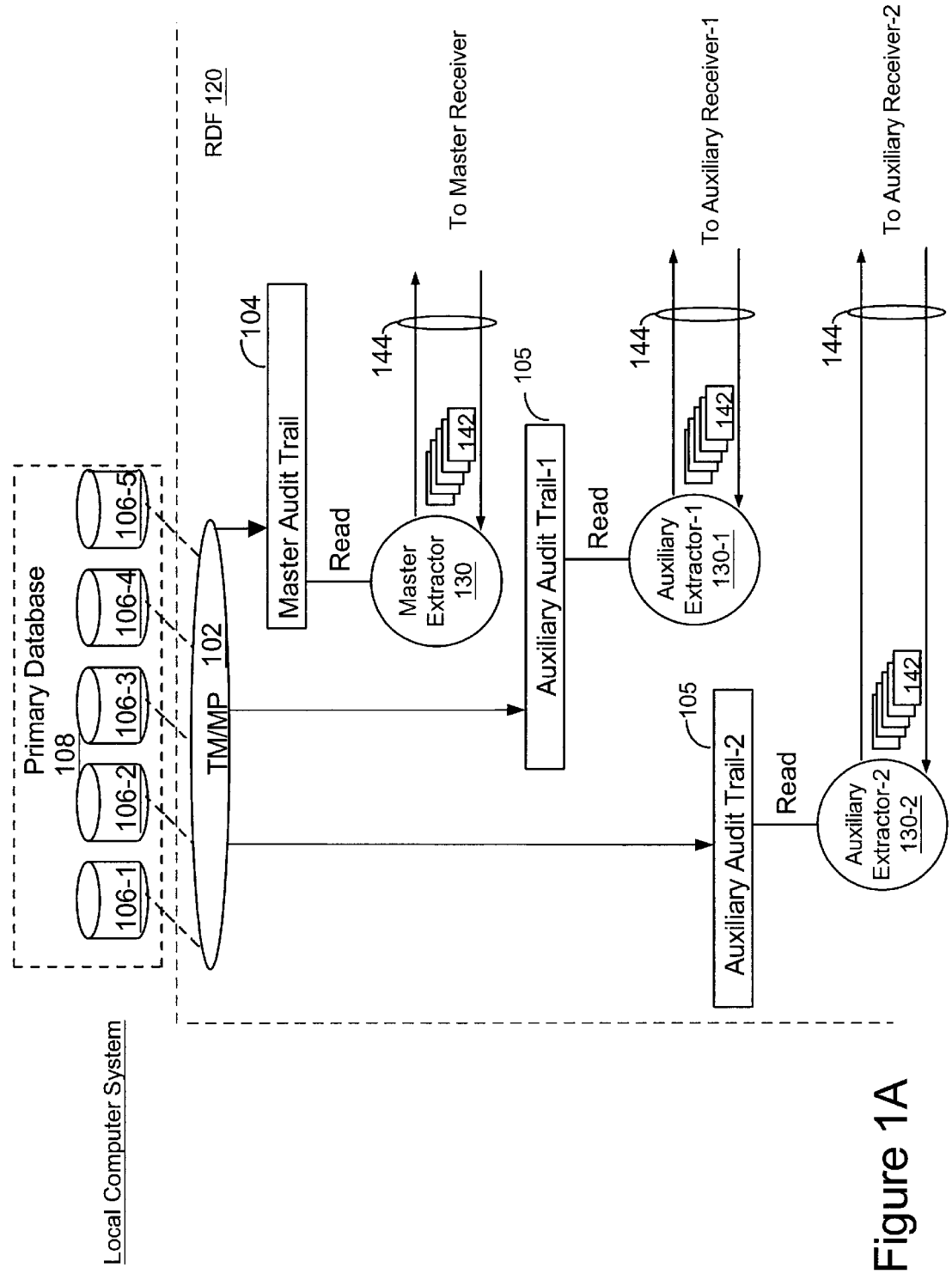
FIGS. 1A and 1B are block diagrams illustrating a database management system with a remote duplicate database facility in accordance with an embodiment of the present invention.
Figure 1B:
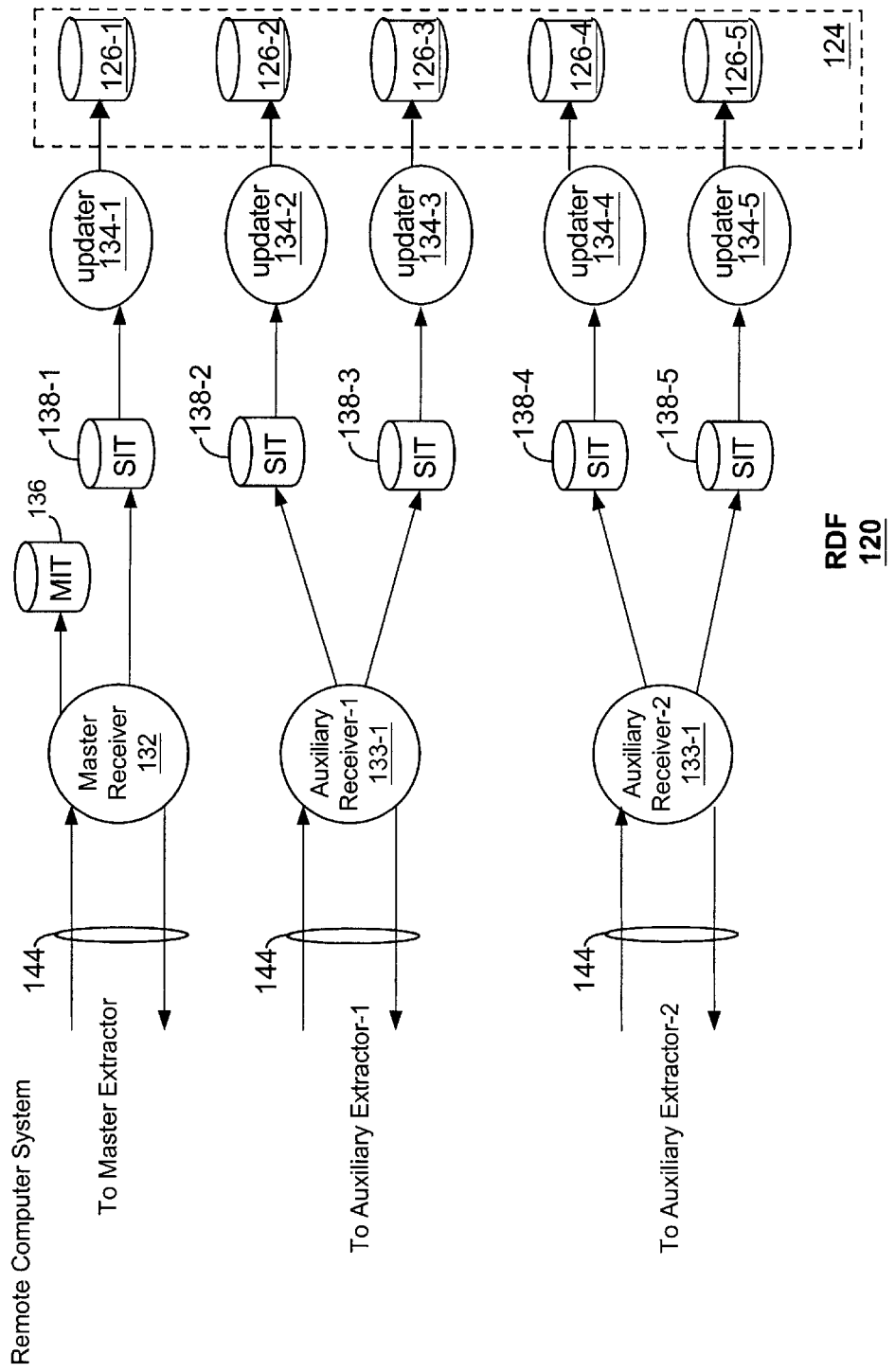

FIGS. 1A and 1B represent the basic architecture of an RDF system 120 according to one embodiment of the present invention. In RDF system 120, each process has a respective local backup process that is automatically invoked if the primary process fails. Each local backup process is located on a different CPU than its respective primary process, and provides a first level of fault protection. A primary purpose of the RDF (remote data facility) system 120 is to handle failures in the primary system that cannot be resolved through the use of local backup processes (and other local remedial measures), such as a complete failure of the primary system.

FIG. 1A illustrates a portion of the RDF system 120 that resides on a local computer system. As shown, the RDF system 120 has a transaction management facility (TM/MP) 102 that writes audit entries to a master audit trail (MAT) 104 and to a plurality of auxiliary audit trails (AuxATs). The audit entries indicate changes made to "audited files" on "RDF protected volumes" 106 of a primary database 108 on a local computer system. Some RDF protected volumes are configured to write transaction audit records to the MAT 104, while some RDF protected volumes are configured to write transaction audit records to the AuxATs 105.

FIG. 1B illustrates another portion of the RDF system 120 that resides on a remote computer system. The remote computer system may be geographically removed from the local computer system. In some embodiments, the local computer system and the remote computer system may be located on different continents. The RDF 120 maintains a replicated database 124 (also called the backup database) by monitoring changes made to "audited files" on "RDF protected volumes" 106 on a primary system and applying those changes to corresponding backup volumes 126 on the remote computer system. An "audited file" (sometimes called an "RDF audited file") is a file for which RDF protection has been enabled, and an "RDF protected volume" is a logical or physical unit of disk storage for which RDF protection has been enabled.

On the local computer system, a Master Extractor process 130 reads the master audit trail (MAT) 104, which is a log maintained by the transaction management facility (TM/MP) 102, and sends the audit records extracted from the MAT 104 to a Master Receiver process 132 on the remote computer system. When the Master Extractor process 130 extracts the audit records from the MAT 104, the Master Extractor process 130 inserts Audit Trail Position (ATPosn) values into the audit records. Thus, the Master Receiver process 132 receives audit records that contain the records' positions on the MAT 104.

The MAT 104 is stored as a series of files with sequentially numbered file names. The MAT files are all of a fixed size (configurable for each system), such as 64 Mbytes. The TMF 102 and Master Extractor 130 both are programmed to progress automatically (and independently) from one MAT file to the next.

Auxiliary Extractor processes 131 reads the auxiliary audit trails (AuxATs) 105, which are also audit logs maintained by the transaction management facility (TM/MP) 102. After extracting audit records from the AuxATs 105, the Auxiliary Extractor processes 131 insert in the audit records Audit Trail Position (ATPosn) values corresponding to the positions of the audit records in their respective AuxATs, and send the extracted audit records to Auxiliary Receiver processes 133 on the remote computer system. The Auxiliary Receiver processes 133 thus receive audit records of the AuxATs 105 that contain the records' positions on their respective AuxATs 105.

Audit Trails Audit Record Types

Figure 3:
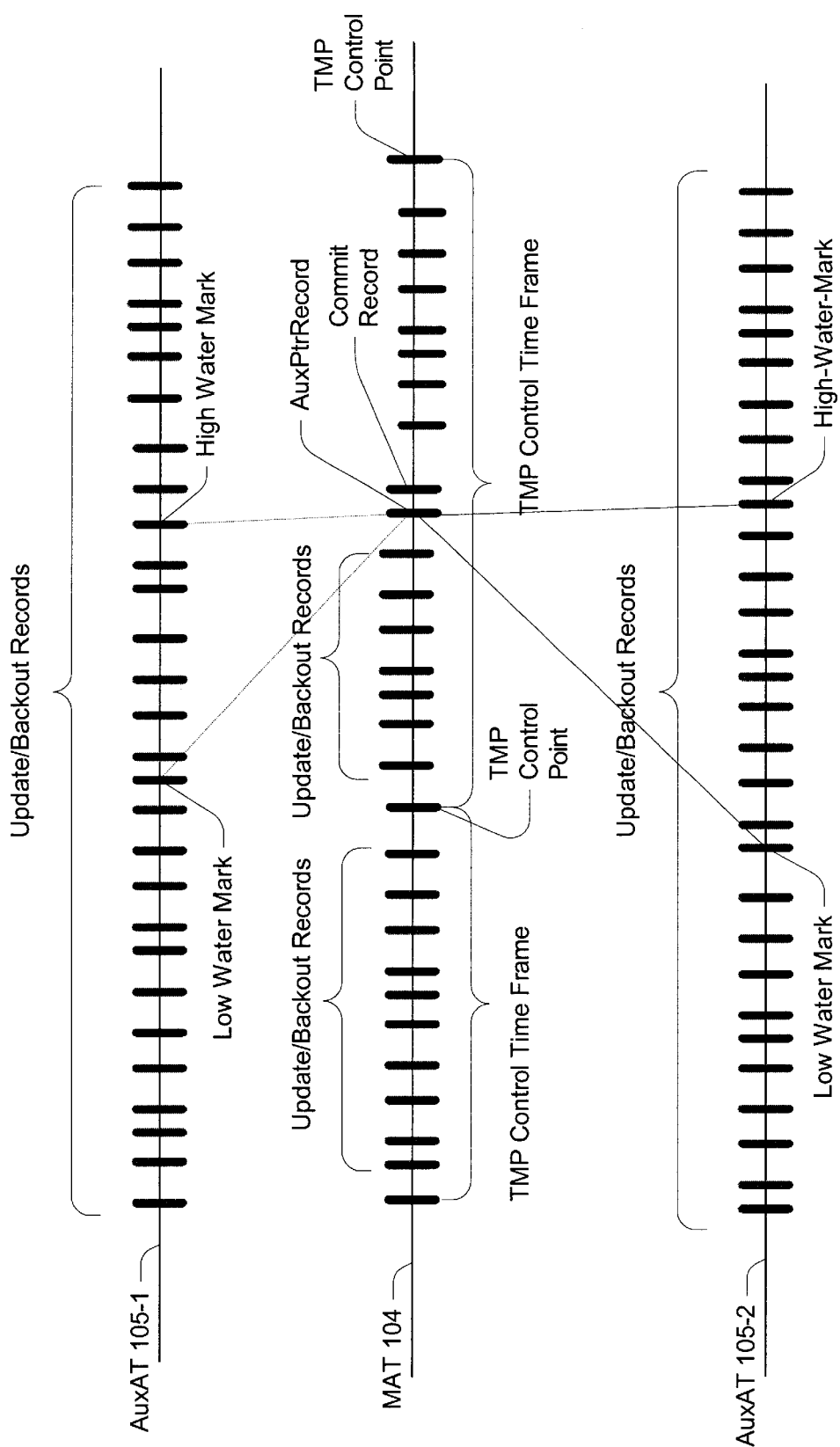
FIG. 3 illustrates a graphical representation of a Master Audit Trail and two Auxiliary Audit Trails in accordance with an embodiment of the present invention.

FIG. 3 is a graphical representation of the MAT 104 and two AuxATs 105. As shown, the master audit trail (MAT) 104 contains the following types of records:

Update records, which reflect changes to a database volume made by a transaction by providing before and after record images of the updated database record. Each update record indicates the transaction ID of the transaction that made the database change and the identity of the database volume and database record that has been updated.

Backout records, which reflect the reversal of previous changes made to a database volume on the primary system. The database changes represented by backout records are sometimes herein called update backouts and are indicated by before and after record images of the updated database record. Backout audit records are created when a transaction is aborted and the database changes made by the transaction need to be reversed. Each backout record indicates the transaction ID of the transaction that made the database change and the identity of the database volume and database record that has been modified by the update backout.

Transaction state records (or, transtate records), including commit and abort records and transaction active records. Commit and abort records indicate that a specified transaction has been committed or aborted. Transaction active records (also sometimes called transaction alive records) indicate that a transaction is active. Each transaction state record indicates the transaction ID of the transaction whose state is being reported. Every active transaction is guaranteed to produce one transaction state record during each TMP control time frame (i.e., between successive TMP control points) other than the TMP control time frame in which the transaction began. A transaction active record is stored in the master audit trail if the transaction does not commit or abort during a TMP control time frame.

TMP control point records, which are "timing markers" inserted by the TMF 102 into the master audit trail at varying intervals depending on the system's transaction load. During heavy transaction loads, TMP control point records may be inserted less than a minute apart; at moderate transaction loads the average time between TMP control point records is about 5 minutes; and under very light loads the time between TMP control point records may be as long as a half hour. The set of audit records between two successive TMP control point records are said to fall within a "TMP control time frame".

Auxiliary Pointer Records, which include a High-Water-Mark and a Low-Water-Mark for each of the Auxiliary Audit Trails 105, that indicate the range of audit records written to the Auxiliary Audit Trails 105 since the last Auxiliary Pointer Record was written to the MAT.

The MAT 104 further includes:

Stop Updaters records, which cause all Updaters to stop when they read this record in their image trails.

Other records not relevant to the present discussion.

The auxiliary audit trails (AuxAT) 105 contain the following types of records:

Update records, which reflect changes to a database volume made by a transaction by providing before and after record images of the updated database record. Each update record indicates the transaction ID of the transaction that made the database change and the identity of the database volume and database record that has been updated.

Backout records, which reflect the reversal of previous changes made to a database volume. The database changes represented by backout records are sometimes herein called update backouts and are indicated by before and after record images of the updated database record. Backout audit records are created when a transaction is aborted and the database changes made by the transaction need to be reversed. Each backout record indicates the transaction ID of the transaction that made the database change and the identity of the database volume and database record that has been modified by the update backout.

Other records not relevant to the present discussion.

The Extractor Processes—Overview

Figure 2A:
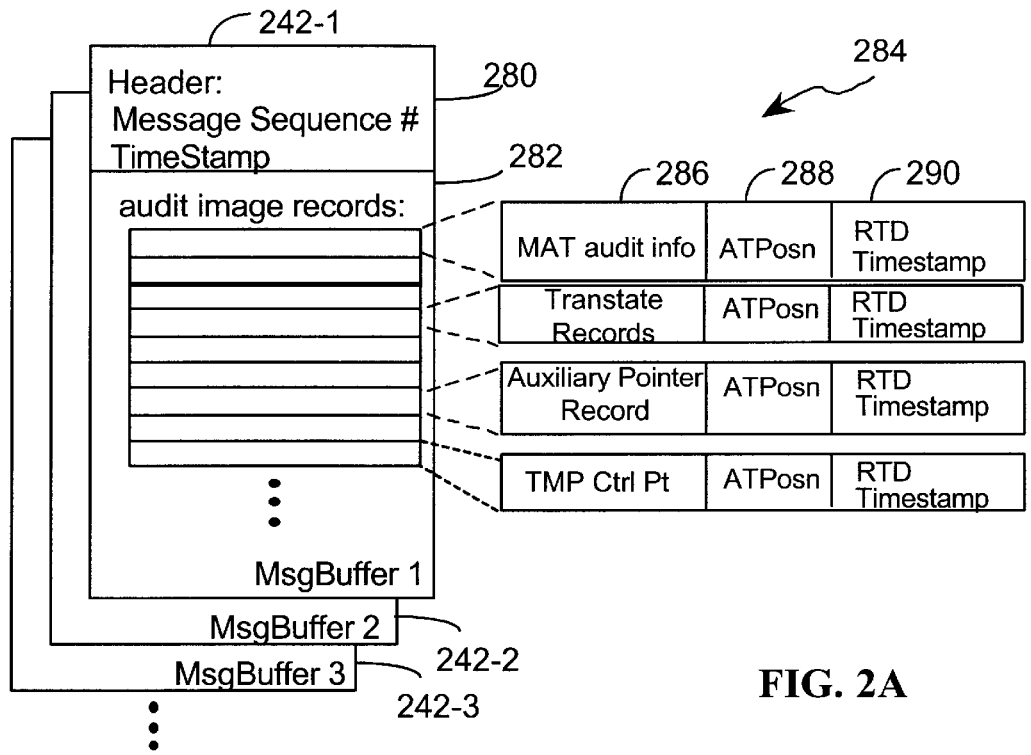
FIGS. 2A and 2B depict data structures used by the extractor processes in accordance with an embodiment of the present invention.

Referring to FIG. 2A, the Master Extractor process 130 adds an Audit Trail Position value (ATPosn) 288 to each audit record that the Master Extractor process 130 extracts from the MAT 104. The ATPosn value is the position of the extracted audit record in the MAT 104. The Master Extractor process 130 also adds a timestamp 290 to each audit record. The added timestamp is known as the RTD timestamp, and is the timestamp of the last transaction to complete prior to generation of the audit record in the MAT 104. The resulting records are called audit image records 284. The Master Extractor process 130 stores each audit image record in message buffers 242, each having a size of about 28K bytes in a preferred embodiment. Note that message buffers 242 for the MAT 104 contain control-type records such as Transaction State Records, TMP Control Point Records, etc., in addition to standard audit information (e.g., update records and backout records).

Figure 2B:
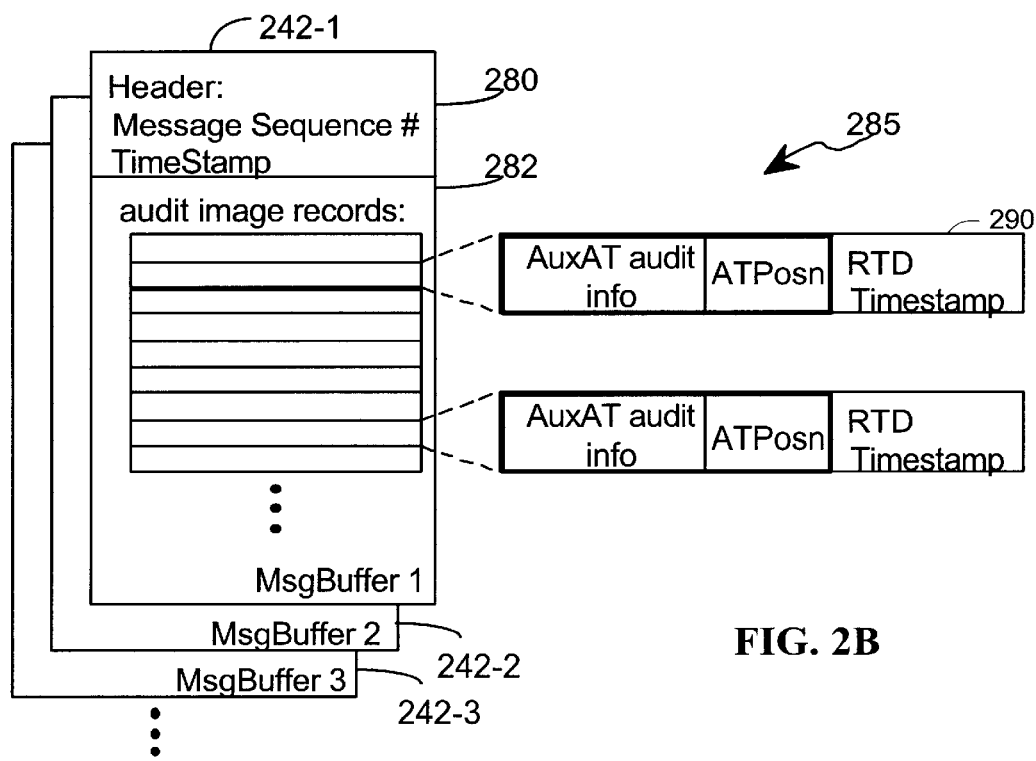

Referring to FIG. 2B, the Auxiliary Extractor processes 131 add an ATPosn value to each audit record that they extract from the AuxATs 105. A timestamp 290 is also added to each audit record. The resulting records are called auxiliary audit image records 285. The Auxiliary Extractor processes 131 store the auxiliary audit image records in message buffers 242. Note that, because the AuxATs 105 do not contain any transaction state records, TMP control point records or Auxiliary Pointer Records, the Auxiliary Extractor processes 131 do not send any such records to the backup system. Thus, the message buffers 242 for the AuxATs 105 do not contain control-type records. In a presently preferred embodiment, each Auxiliary Extractor process 131 is associated with only one of the auxiliary audit trails 105 and vice versa.

Each one of the extractor processes 130, 131 uses two to eight message buffers 242, with four message buffers being a typical configuration. After filling and transmitting a message buffer 242 to the Master Receiver process 132 via a communication channel 144 (FIG. 1), the Master Extractor process 130 does not wait for an acknowledgment reply message from the Master Receiver process 132. Rather, as long another message buffer is available, it continues processing audit records in the MAT 104, storing audit image records in the next available message buffer 242. Auxiliary Extractor processes 131 also transmit message buffers 242 to Auxiliary Receiver processes 133 in a similar manner. Each message buffer 242 is made unavailable after it is transmitted to the receiver processes 132 and 133 until a corresponding acknowledgment reply message is received from the receiver processes 132 and 133, at which point the message buffer 142 becomes available for use by the extractor processes 130 and 131.

These transaction state and TMP control point records and their processing by the RDF system will be explained in more detail below.

The Receiver Processes—Overview

Referring to FIGS. 1A and 1B, the Master Receiver process 132 and Auxiliary Receiver processes 133 upon receiving each message buffer immediately send an acknowledgment to the corresponding Extractor process. In a presently preferred embodiment, no processing of the message buffer is performed before the acknowledgment is sent. The RDF system provides tight synchronization of the Extractor and Receiver processes and provides for automatic resynchronization whenever a start or restart condition occurs. For example the two processes will resynchronize whenever either process is restarted or has a primary process failure, and whenever the Receiver process receives audit records out of order from the Extractor process.

Figure 4:
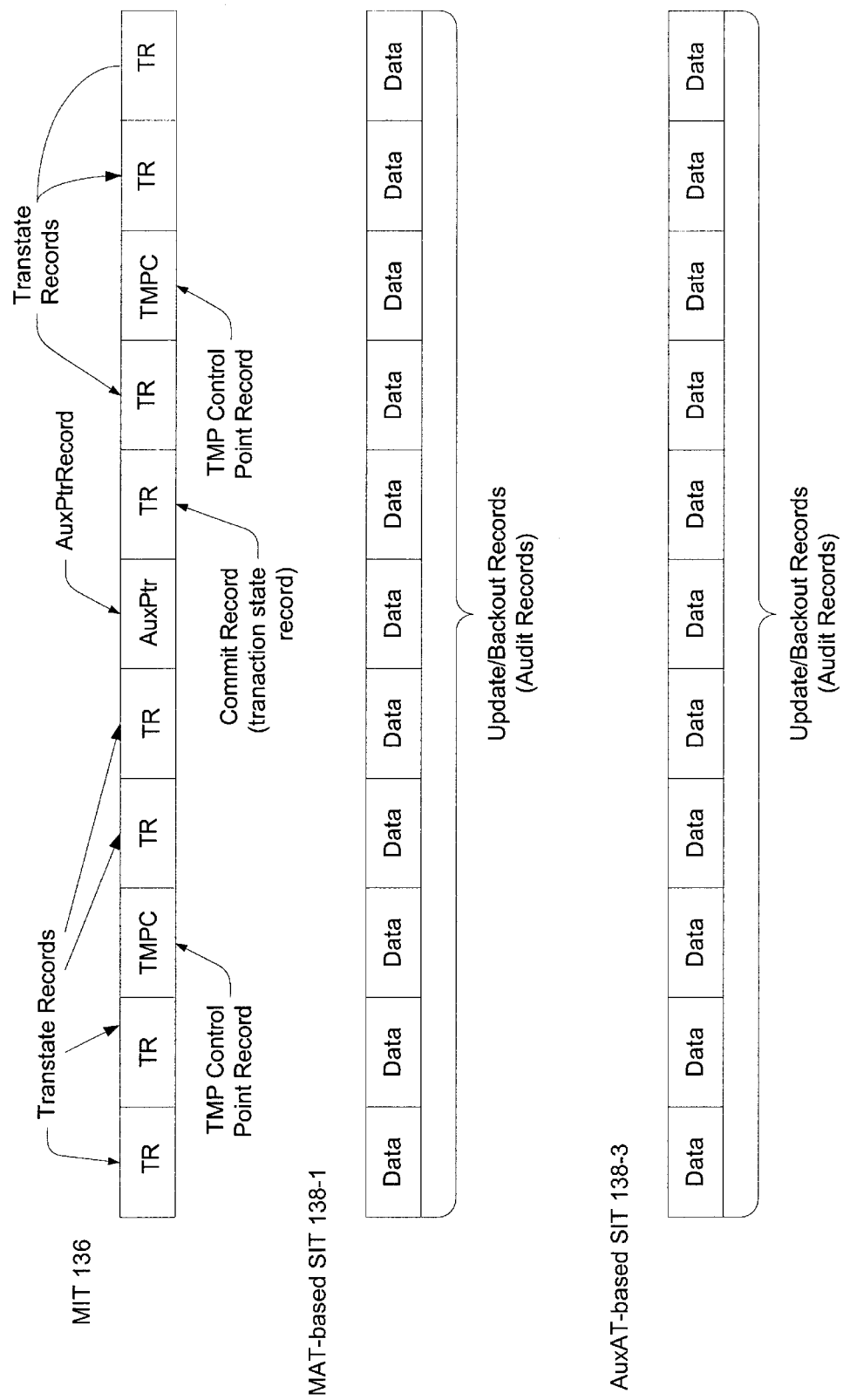
FIG. 4 illustrates a graphical representation of a Master Image Trail and two Secondary Image Trails in accordance with an embodiment of the present invention.

In a presently preferred embodiment, the Master Receiver process 132 sorts received audit records from the MAT 104 such that (A) transaction state records (including commit/abort records), TMP control point records, and Auxiliary Pointer Records are stored only in the master image trail (MIT) 136, and (B) each database update and backout audit record is moved into one or more secondary image trails (SIT) 138. Note that in some embodiments, some control-type records may be stored in the SITs 138. The Auxiliary Receiver processes 133 sort received audit records from AuxATs 105 and distribute the audit records into one or more SITs 138. In the embodiment illustrated in FIG. 1B, each one of the SITs 138 corresponds to one Updater process 134 that will use that audit record to update data stored on a backup volume 126. In some other embodiments, multiple Updater processes 134 and multiple backup volumes 126 may be associated with a single SIT 138. A graphical representation of the MIT 136 and a SIT 138 is illustrated in FIG. 4. Note that the MIT 136 contains control-type audit records only.

The Master Receiver process 132 examines the received Auxiliary Pointer Records, and maintains a table of current High-Water-Mark indicators for the Auxiliary Audit Trails. The Master Receiver process 132 periodically sends the High-Water-Mark indicators to the corresponding Auxiliary Receivers. The Auxiliary Receivers then store the High-Water-Mark indicators for their auxiliary audit trails as the limit positions for the Updaters 134.

Updater Processes—Overview

Each RDF-protected volume 106 on the primary computer system 110 has its own Updater process 134 on the backup computer system 122 that is responsible for applying audit image records to the corresponding backup volume 126 on the backup computer system 122 so as to replicate the audit protected files on that volume. Audit image records associated with both committed and aborted transactions on the primary system are applied to the database on the remote backup computer system 122. In RDF system 120, no attempt is made to avoid applying aborted transactions to the backup database, because it has been determined that it is much more efficient to apply both the update and backout audit for such transactions than to force the updaters to wait until the outcome of each transaction is known before applying the transaction's updates to the backup database. By simply applying all logical audit to the backup database, the updaters are able to keep the backup database substantially synchronized with the primary database. Also, this technique avoids disruptions of the RDF system caused by long running transactions. In some RDF systems, long running transactions would cause the backup system to completely stop applying audit records to the backup database until such transactions completed.

The audit image records in each image trail 136, 138 are typically read and processed by one to ten Updaters 134. Each Updater 134 reads all the audit image records in the corresponding image trail, but utilizes only the audit image records associated with the primary disk volume 106 for which that Updater is responsible.

In a presently preferred embodiment, the Master Receiver process 132 and the Auxiliary Receiver processes 133 inform the Updaters 134 how far they should read by sending limit positions to the Updaters 134. When an Updater process 134 reaches a limit position, which is treated by the Updater as the logical end of file of the image trail 136, 138 to which it is assigned, it performs a wait for a preselected amount of time, such as two to ten seconds before sending another message to the Receiver to request an updated limit position. Only when the limit position is updated can the Updater read more audit image records. In a presently preferred embodiment, the limit positions for the AuxAT-based Updaters (i.e., Updaters that apply audit records from AuxAT-based SITs to the backup database) are the High-Water-Mark positions of the associated AuxAT received by the corresponding Auxiliary Receivers. For instance, the limit position for Updaters 134-4 and 134-5 will be the High-Water-Mark position of the AuxAT 105-2 received by Auxiliary Receiver 133-2.

The Updaters 134 have two types of operations: a redo pass and an undo pass. The redo pass is the normal mode of operation, in which update and backout audit is "redone" to a backup volume. The undo pass, which is not performed in the normal mode of operation, is used for removing all database changes caused by questionable transactions. For example, transactions whose final outcome is unknown are "undone," and transactions that may be missing audit records are also "undone" despite of the status of their last known state. The undo pass is typically performed in a Takeover operation, or when the primary computer system fails. A detailed description of a Redo operation by an Updater is described in detail in the above referenced patents and patent applications.

Identifying Questionable Transactions

Upon the occurrence of a predefined event, such as failure of the local computer system, the Receiver processes 132, 133 complete all processing of previously received message buffers, flush all the image trail buffers to disk, and determine the audit trail positions of the last audit records the Receiver processes 132, 133 received from their associated Extractors 130. The audit trail position of the last audit record received by Auxiliary Receiver 133-1 or 133-2 is referred herein as a High-Water-Mark position. The RDF system 120 then identifies a set of questionable transactions. Questionable transactions include transactions whose last known transaction state is not committed or aborted, as well as transactions whose last known transaction state is committed or aborted but for which the completeness of their audit records is indeterminant. Thereafter, the Updater 134 backs out the questionable transactions.

According to one embodiment of the invention, the Updaters 134 rely on an Undo List when undoing transactions with unknown outcomes and transactions with missing audit data. It is noted here that the Undo List is generally not created during normal mode operation. Rather, the Undo List is generally created during a takeover operation. However, it is appreciated that the Undo List may be generated not only during a takeover operation, but also when a Stop Updaters at Timestamp operation is performed. Takeover operation and Stop Updaters at Timestamp operation are described in detail in the previously referenced patents and patent applications.

For the purposes of this explanation, it will be assumed that the Undo List is generated by a process herein called the Purger. However, in other embodiments the Undo List could be generated by the Master Receiver or another process. Further, in some embodiments, different processes may be used for generating the Undo List under different operating conditions.

An additional function of the Purger process is periodically deleting image trail files that are not needed. Because the Updaters apply audit to the backup database even for transactions whose outcome is unknown, the Purger can only delete image trail files all of whose audit records correspond to transactions whose outcome is known to the backup system. A purger process for deleting unnecessary image trail files in a data replication system with multiple audit logs is described in co-pending United States provisional patent application entitled "SYSTEM AND METHOD FOR PURGING DATABASE UPDATE IMAGE FILES AFTER COMPLETION OF ASSOCIATED TRANSACTIONS FOR A DATABASE REPLICATION SYSTEM WITH MULTPLE AUDIT LOGS" filed Jun. 15, 2001 and bearing Ser. No. 09/883,067.

Figure 5:
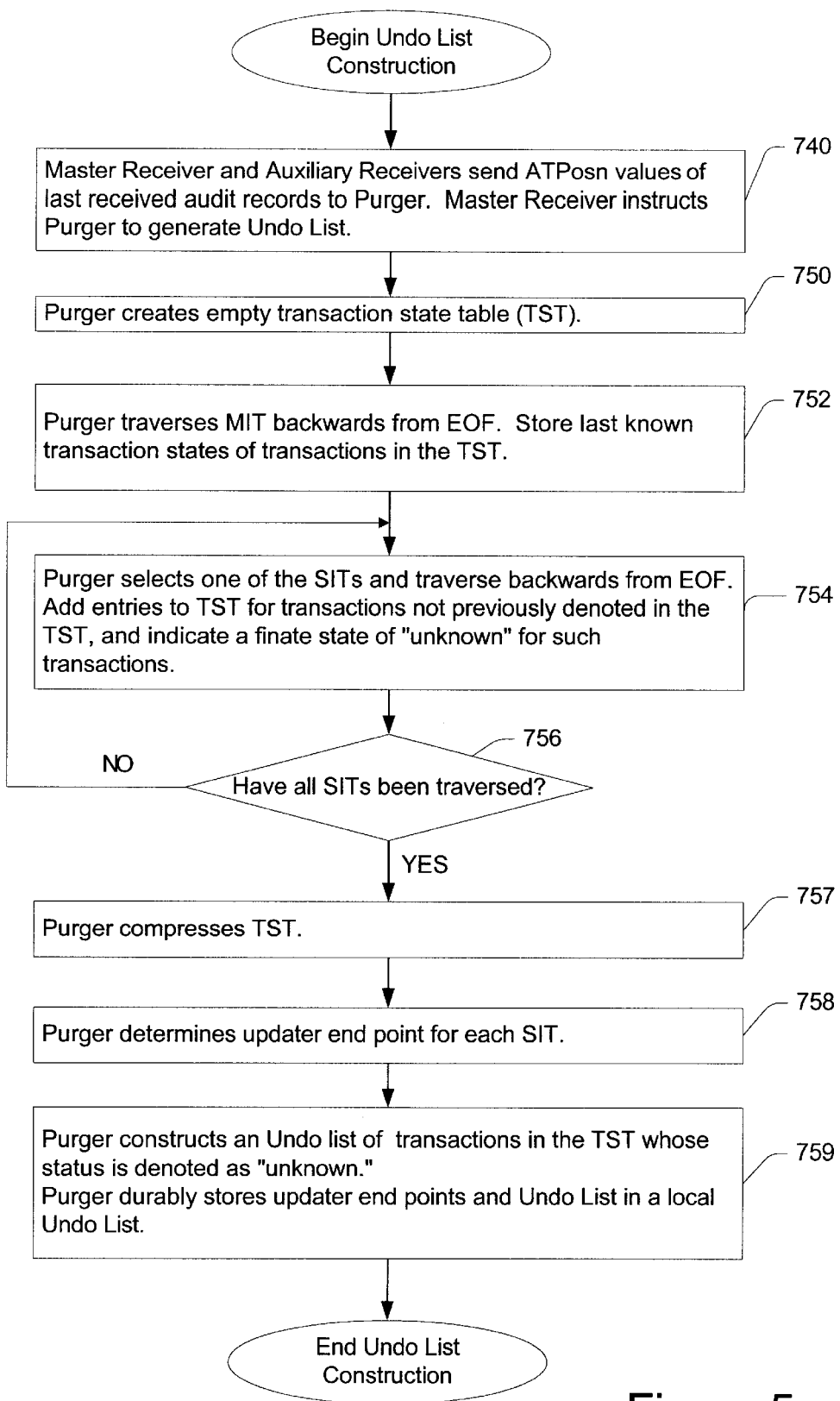
FIG. 5 is a flow diagram illustrating a process of identifying questionable transactions for "undoing" in accordance with an embodiment of the present invention.

Referring to FIG. 5, which is a flow diagram illustrating a process of constructing an Undo List in accordance with an embodiment of the present invention. As illustrated, the Master Receiver and the Auxiliary Receivers send the ATPosn values of the last audit records they received to the Purger (740). Recall that, in a presently preferred embodiment, the Master Receiver and the Auxiliary Receivers keep track of the latest ATPosn values (or, the highest ATPosn values) of the audit records they received. The Master Receiver also instructs the Purger to create the Undo List after it is sure that all information needed by the Purger has been durably stored.

The Purger, upon receiving the instruction from the Master receiver to create the Undo List, creates an empty transaction status table TST (750).

Then, the Purger traverses the Master Image Trail (MIT) backwards from the End-Of-File (EOF) (752). For each transaction state record in the MIT that is read during the traversal, the transaction state is stored in the TST as the last known state for that transaction only if no information about the transaction has been previously stored in the TST. In other words, only the last known transaction states contained in the MIT is stored in the TST. Also, if the last known state for a transaction is not "commit" or "abort," it is denoted as "unknown" in the TST.

When the Purger encounters an Auxiliary Pointer Record, the Purger extracts the High-Water-Mark positions therefrom. The Purger compares the extracted High-Water-Mark positions against the High-Water-Mark positions it received from the Receiver processes. If any one of the High-Water-Mark positions the Purger received from the Receiver processes is lower than the corresponding High-Water-Mark position the Purger extracted from the Auxiliary Pointer Record, indicating that audit records are missing from one or more of the Auxiliary Audit Trails, then all the transactions marked "committed" or "aborted" in the TST are marked "unknown". If the High-Water-Mark positions the Purger received from the Receiver processes are all higher than the corresponding the High-Water-Mark positions the Purger extracted from the Auxiliary Pointer Record, then the "committed" or "aborted" status in the TST is not modified.

Figure 7A:
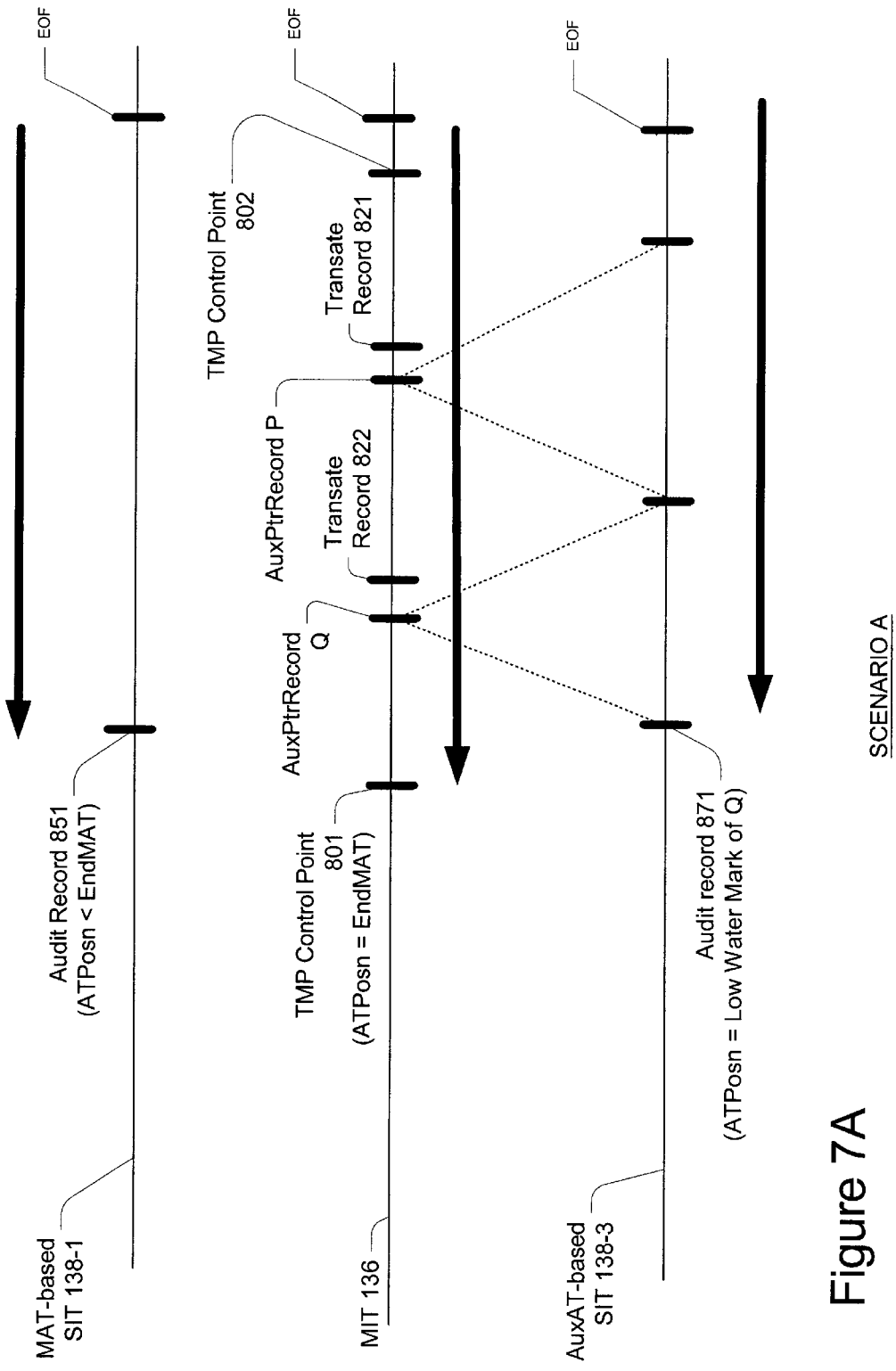
FIGS. 7A–7C depict three scenarios that may be encountered when constructing a transaction state table in furtherance of an embodiment of the present invention.

The Purger continues the traversal of the MIT until it has traversed a complete TMP Control Time Frame that is represented by two successive TMP Control Points. Traversal of the MIT stops at that point unless one of the High-Water-Mark positions the Purger received from the Receiver processes is lower than the corresponding High-Water-Mark position in the last Auxiliary Pointer Record. One scenario is illustrated in FIG. 7A and labeled Scenario A. In Scenario A, the Purger traverses the MIT 136 backwards from its EOF through TMP Control Point 802, two transaction state records 821 and 822 and two Auxiliary Pointer Records P and Q until it reaches TMP Control Point 801. The Auxiliary Pointer Records P and Q do not have any High-Water-Mark position that is higher than the High-Water-Position of the Auxiliary Audit Trail, indicating that no audit record is missing. Accordingly, as shown in FIG. 7A, the Purger stops traversing the MIT 136 at TMP Control Point 801. Furthermore, the transactions associated with the transaction state records 821 and 822 retain their status of "committed" or "aborted" in the TST.

Figure 7B:
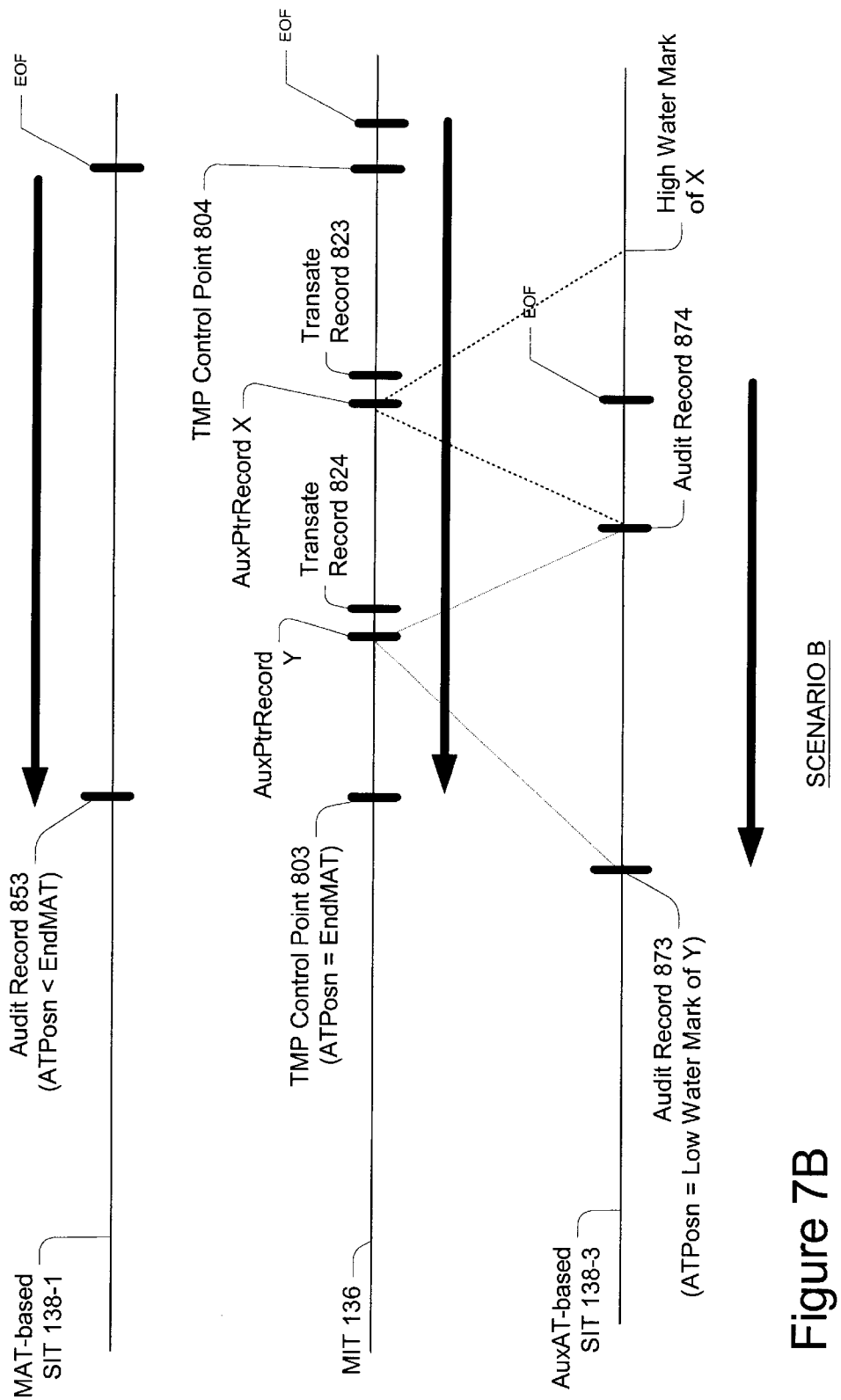

Another possible scenario is illustrated in FIG. 7B and labeled Scenario B. In Scenario B, one of the High-Water-Mark positions the Purger received from the Receiver processes is lower than the corresponding High-Water-Mark position in one of the Auxiliary Pointer Records. Specifically, the High-Water-Mark position of the Auxiliary Audit Trail associated with AuxAT-based SIT 138-3 that the Purger received from the Receiver processes is lower than the corresponding High-Water-Mark position in Auxiliary Pointer Record X but higher than the corresponding High-Water-Mark position in the Auxiliary Pointer Record Y. In this scenario, the Purger stops traversing the MIT 136 at TMP Control Point 803. Furthermore, the transaction state of the transaction associated with the transaction state record 823 is changed to "unknown" in the TST. The transaction state of the transaction associated with the transaction state record 824 remains unchanged in the TST.

Figure 7C:
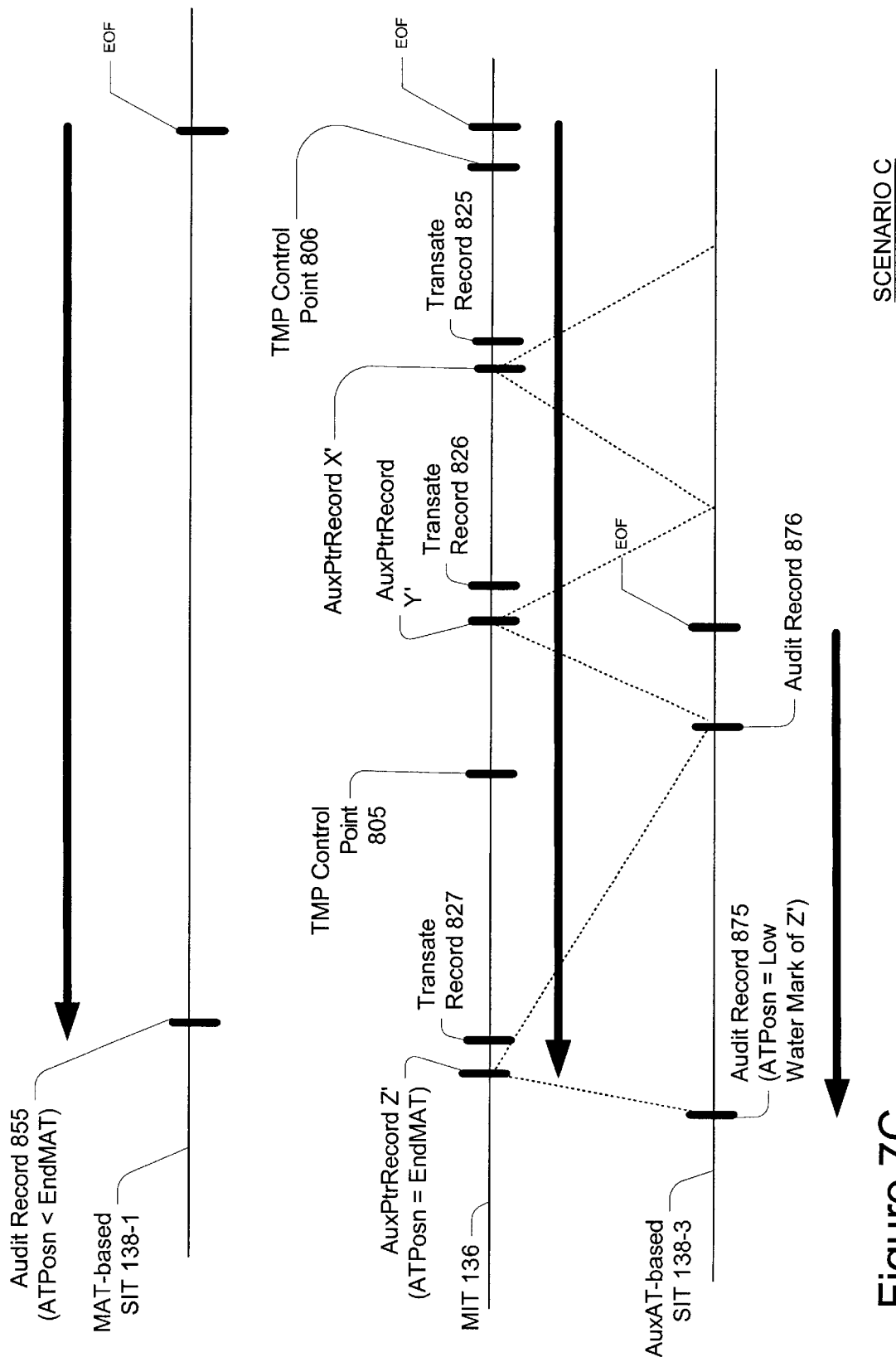

However, if an Auxiliary Pointer Record containing High-Water-Mark positions that are all lower than those the Purger received from the Receiver processes is not found before the Purger has finished traversing a complete TMP Control Time Frame, the Purger continues traversing the MIT and updating the TST until such an Auxiliary Pointer Record is found. This scenario is illustrated in FIG. 7C and labeled Scenario C. As shown in FIG. 7C, the Purger continues traversing the MIT 136 until an Auxiliary Pointer Record Z' is found. The transaction states of the transactions associated with the transaction state records 825 and 826 are changed to "unknown" in the TST. The transaction associated with the transaction state record 827, however, retains the status of "committed" or "aborted" in the TST.

In all three of the above scenarios, the Purger stores the value of the ATPosn of audit record at which it stops traversing. The Purger also stores the Low-Water-Mark positions of the last Auxiliary Pointer Record it encountered. For example, in Scenario A, the Purger stores the ATPosn value of the TMP Control Point 801 as an "EndMAT" position and the Low-Water-Mark positions of Auxiliary Pointer Record Q. In Scenario B, the Purger stores the ATPosn value of the TMP Control Point 803 as an "EndMAT" position and the Low-Water-Mark positions of the Auxiliary Pointer Record Y. In Scenario C, the Purger stores the ATPosn value of the Auxiliary Pointer Record Z' as the "EndMAT" position and the Low-Water-Mark positions of Auxiliary Pointer Record Z'.

In a presently preferred embodiment, the state of every active transaction must be represented by a transaction state record during each TMP Control Time Frame, except for transactions that initiated during that TMP Control Time Frame. Thus, the backward traversal of the MIT (752) will identify all transactions whose state is known at the point in time in the primary system represented by the last of the audit records received by the backup system.

After the MIT is traversed, the Purger traverses each of the SITs one SIT at a time to find transactions that are not already represented in the TST (754). If the SIT is a MAT-based SIT (e.g., MAT-based SIT 138-1), the Purger traverses from its EOF position to a position that is lower than the previously determined EndMAT position. Transaction IDs of audit records found in the MAT-based SIT, but not already present in the TST, are added to the TST. The newly added transaction IDs are denoted to have an "unknown" final outcome. For example, in Scenario A, the Purger traverses MAT-based SIT 138-1 from its EOF until it reaches an audit record 851 having an ATPosn that is lower than the "EndMAT" position. In Scenario B, the Purger traverses MAT-based SIT 138-1 from its EOF until it reaches an audit record 853 having an ATPosn that is lower than the "EndMAT" position. In Scenario C, the Purger traverses MAT-based SIT 138-1 from its EOF until it reaches an audit record 855. Transaction IDs of audit records found in the MAT-based SIT 138-1 during the traversal, but are not already present in the TST, are added to the TST and are denoted as having an "unknown" final outcome.

If the SIT is an AuxAT-based SIT, the Purger traverses from its EOF position to until it reaches an audit record whose ATPosn is equal to the Low-Water-Mark position of the last Auxiliary Pointer Record the Purger encountered. For example, in Scenario A, the Purger traverses the AuxAT-based SIT 138-3 from its EOF position to the audit record 871 whose ATPosn is equal to the Low-Water-Mark position of the Auxiliary Pointer Record Q. In Scenario B, the Purger traverses the AuxAT-based SIT 138-3 from its EOF position to the audit record 873 whose ATPosn is equal to Low-Water-Mark position of the Auxiliary Pointer Record Y. In Scenario C, the Purger traverses the AuxAT-based SIT 138-3 from its EOF position to the audit record 875 whose ATPosn is equal to the Low-Water-Mark position of the Auxiliary Pointer Record Z'. Transaction IDs of audit records found in the AuxAT-based SIT 138-3 during the traversal, but are not already present in the TST, are added to the TST and denoted as having an "unknown" final outcome.

The Purger continues to traverse the SITs until all the SITs have been traversed (756). When all the SITs have been traversed, the TST table is complete.

Figure 6:
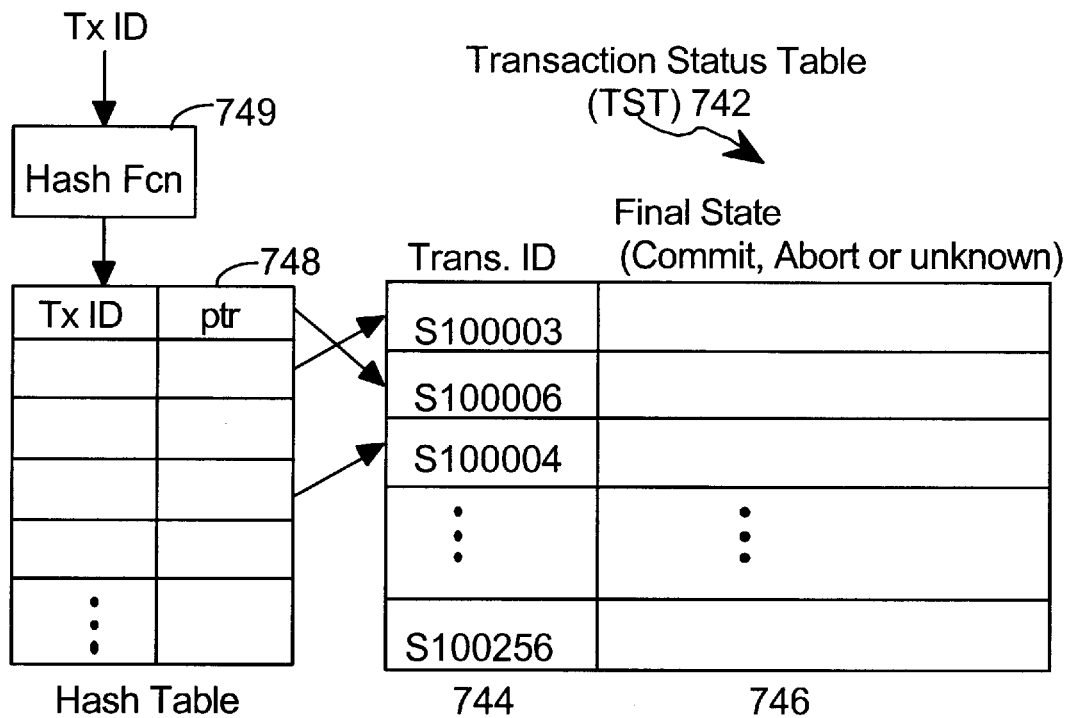
FIG. 6 depicts a transaction status table (TST).

An example of a completed TST 742 is illustrated in FIG. 6. The TST 742 is configured to store, for each transaction, the transaction ID 744, and the final state 746 of the transaction, if it is known. A hash table 748 is used to locate items in the TST 742. In particular, the transaction identifier (TxID) of a transaction is converted into a hash table index by a hash function 749, and then an item in the hash table either at the index position or after the index position contains a pointer to the TST entry for that transaction. The TST 742 is preferably filed with entries in sequential order, starting either at the top or bottom of the TST. Note that the TST 742 does not have to be implemented as a table. In some embodiments, the TST may be implemented as a link list.

With reference again to FIG. 5, after the SITs are traversed and the TST is updated, the Purger then compresses the TST to form a "compressed TST" (757). The "compressed TST" is similar with TST 742, but the hash table is rebuilt to include only entries for transactions whose status is denoted as unknown.

After building the compressed TST, the Purger next determines the Updater End Points such that the Updaters will know where to stop performing the Undo operations (758).

In order to find the Updater End Points, the Purger resumes backward traversal of the MIT from the "EndMAT" position until it reaches a TMP Control Time Frame that does not have transaction state records for transactions that are marked "unknown" in the TST. Recall that, in a presently preferred embodiment, a transaction that is active during a particular TMP Control Time Frame must have a corresponding transaction state record that particular TMP Control Time Frame unless the transaction is initiated in that particular TMP Control Time Frame. Thus, in the presently preferred embodiment, the Updater End Point for the MAT-based SIT is set to be the TMP Control Point after the TMP Control Point Time Frame in which none of the transaction records is associated with any of the transactions marked "unknown" in the TST. The Updater End Point for an AuxAT-based SIT is set to be the corresponding Low-Water-Mark position in the last Auxiliary Pointer Record traversed.

Figure 9:
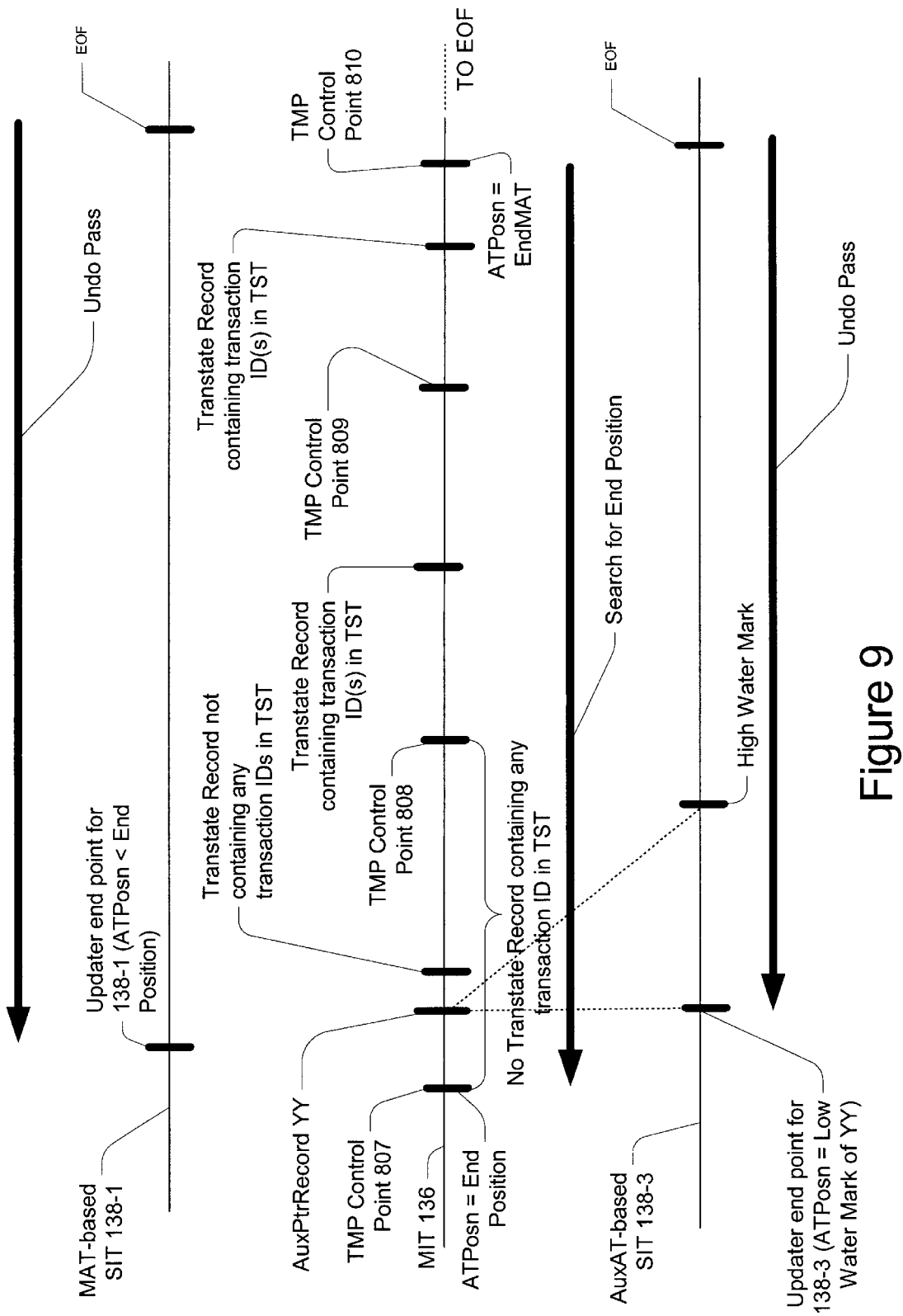
FIG. 9 depicts an Updater Undo Pass for backing out updates for questionable transactions in accordance with an embodiment of the present invention.

An Updater End Point for the MAT-based SIT 138-1, an Updater End Point for the AuxAT-based SIT 138-3, and a TMP Control Point Time Frame having no transaction state record that corresponds to any transaction marked "unknown" in the TST are shown in FIG. 9.

In a presently preferred embodiment, the TMP Control Time Frame having no transaction state records corresponding to any questionable transactions can be identified as follows. In this embodiment, in the TST, each transaction ID denoted as having an "unknown" status has an "alive" flag. Before the traversal, all "alive" flags are set to "OFF." Then, the MIT is traversed backwards for one TMP Control Time Frame. If any transaction state record is encountered in this TMP Control Time Frame and if the transaction state record pertains to a transaction denoted in the TST as having an "unknown" final state, the Purger sets the corresponding "alive" flag to "ON." If at the end of this TMP Control Time Frame, there is at least one "alive" flag that is "ON," the Purger resets all the "alive" flags to "OFF" and traverses the MIT backwards for another TMP Control Time Frame. Again, if the transaction state records encountered in this TMP Control Time Frame contain at least one of those transaction IDs denoted as "unknown" in the TST, the Purger sets the corresponding "alive" flag to "ON." If at the end of this TMP Control Time Frame, all the "alive" flags are "OFF," the Purger can stop traversing the MIT. The ATPosn of the last TMP Control Point Record is the Updater End Point for the MAT-based SITs. The Low-Water-Mark positions of the last Auxiliary Pointer Record traversed will be the Updater End Points for the AuxAT-based SITs.

In the example illustrated in FIG. 9, the MIT 136 is traversed from the previously determined "EndMAT" position until a TMP Control Time Frame where none of the transaction state records contains a transaction ID denoted as "unknown" in the TST. In the illustrated example, the Purger traverses through TMP Control Point 809 and stops at the TMP Control Point 808. Since there is a transaction state record containing transaction ID(s) in the TST between TMP Control Points 808 and 809, the Purger continues to traverse to the next successive TMP Control Point 807. As shown, the transaction state records between TMP Control Points 807 and 808 do not contain any transaction ID represented in the TST, the Purger has found the TMP Control Time Frame where none of the transaction state records contains a Transaction ID denoted as "unknown" in the TST. The ATPosn of the TMP Control Point 807 is used as the Updater End Point for the MAT-based SIT 138-1. The last Auxiliary Pointer Record encountered by the Purger during this traversal is the Auxiliary Pointer Record YY. A Low-Water-Mark position of the Auxiliary Pointer Record YY is used as the Updater End Point for the AuxAT-based SIT 138-3.

With reference again to FIG. 5, when the Updater End Points are determined, the Purger constructs a compact list of all the transactions in the TST whose status is denoted as "unknown." (759). This is preferably done by storing these entries at the top of the transaction status table, and the resulting table of transactions is herein called the "compressed transaction status table" or an Updater Undo List. The Purger then durably stores the Updater End Points and the Undo List in a Local Undo List. In a presently preferred embodiment, the Local Undo List is stored at the same location where the MIT is durably stored.

Updater Undo Pass

In a presently preferred embodiments, after each Updater finishes its Redo Pass, it requests permission from the Purger to perform an Undo Pass. The Purger responds to that request only after it completes generation of the Undo List.

After permission is granted by the Purger, the Updater then follows the Undo List, and backs out of the database updates associated with the transactions listed therein.

Figure 8:
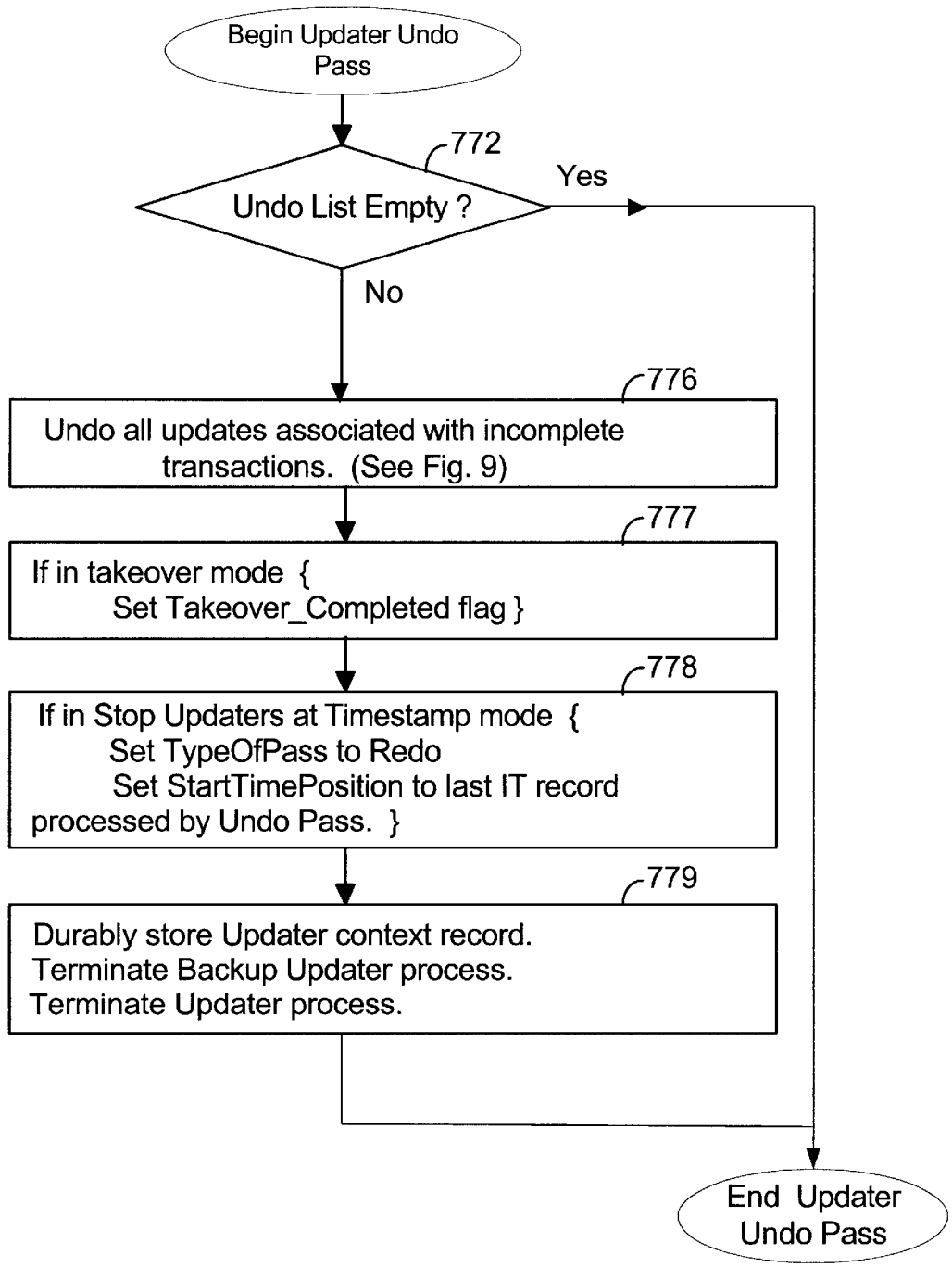
FIG. 8 depicts a flow chart of an Updater Undo procedure according to an embodiment of the present invention.

FIG. 8 is a flow diagram illustrating an Updater Undo Procedure implemented according to an embodiment of the present invention. As shown in FIG. 8, upon receiving the permission to perform an Undo Pass, the Updater checks to see if the Local Undo List is empty (772). If so, it stops and ends the Undo Pass.

Otherwise, the Updater undoes all updates associated with incomplete transactions (776). In a presently preferred embodiment, the Updater traverse the SITs backwards from their EOFs to the Updater End Points determined by the Purger. For each audit record read, the Updater checks the Local Undo List. If the transaction ID for the transaction is not present in the Local Undo List, the audit record is not further processed. On the other hand, if the transaction ID for the transaction is present in the Local Undo List, the update represented by the audit record is undone, and a corresponding exception record is written to an exceptions log. As many undo operations as can be performed during each transaction timer period are performed as a single Updater transaction.

Next, if the backup system is in takeover mode, the Updater sets its Takeover_Completed flag (777). If the backup system is in Stop Updaters at Timestamp mode, the Updater sets the TypeOfPass context record field to Redo, sets the StopUpdateToTime Completed flag to True, and sets the StartTimePosition field to point to the last image trail record processed by the Undo Pass (778). Then the Updater durably stores its context records (779), and exits by terminating the Updater process and the backup Updater process (779). The different mode of operations are described in detail in the above referenced patents and patent applications.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. For instance, while the embodiments of the invention were mainly discussed in conjunction with Takeover operations of an RDF system, it should be understood that the principles the invention are equally applicable to Stop-Updater-To-Timestamp operations in an RDF system without departing from the true spirit and scope of the present invention.

Furthermore, it should be understood that the tasks performed by the Receiver, Updater, and Purger processes of the preferred embodiment can, in other embodiments, be performed by processes performing other tasks as well, or by a different set of processes.

The present invention can be implemented as a computer program product that includes a computer program mechanism embedded in a computer readable storage medium. For instance, the computer program product could contain the program modules for one or more of the Receiver, Updater and Purger processes. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

What is claimed is:

1. A method of operating a backup system so as to replicate database updates performed on a primary system, the method comprising:

receiving a first stream of first audit records from the primary system, the first audit records including first audit update records and first audit backout records indicating database updates and database backouts pertaining to database transactions performed on the primary system, each first audit record further including an audit trail position indicator unique to the first stream;

receiving a second stream of second audit records from the primary system, the second audit records including second audit update records and second audit backout records indicating database updates and database backouts pertaining to the database transactions, each second audit record further including an audit trail position indicator unique to the second stream;

the first stream of first audit records further comprising control records that have sufficient information to enable the backup system to determine, upon occurrence of a predetermined event, whether a commit/abort outcome for each of the database transactions is known and whether the first stream of first audit records and the second stream of the second audit records received by the backup system contain a complete set of audit records for each of the database transactions with known commit/abort outcomes;

storing the control records in a first image trail;

storing the first audit update records and the first audit backout records in one or more second image trails;

storing the second audit update records and the second audit backout records in one or more third image trails;

for each second image trail, sequentially applying to a backup database database updates and database backouts indicated by the first audit update records and first audit backout records in the second image trail, without regard to whether corresponding transactions in the primary system committed or aborted;

for each third image trail, sequentially applying to the backup database database updates and database backouts indicated by the second audit update records and the second audit backout records in the third image trail, without regard to whether corresponding transactions in the primary system committed or aborted;

upon occurrence of the predefined event,
determining an undo set of transactions comprising transactions for which a commit/abort outcome is unknown and transactions for which the commit/abort outcome is known but for which the backup system comprises an incomplete set of audit records; and for each second image trail and for each third image trail, undoing database updates for the undo set of transactions.

2. The method of claim 1, wherein the determining comprises:
    examining transaction identifiers contained in the control records to determine transactions for which a commit/abort outcome is known;
    first comparing the transaction identifiers against transaction identifiers contained in the audit records of the second image trail and the third image trail to determine transactions for which the commit/abort outcome is unknown; and
    second comparing contents of the control records with an audit trail position of a last one of the second audit records to determine transactions for which the commit/abort outcome is known but for which the backup system comprises an incomplete set of audit records.

3. The method of claim 2, wherein control records comprise an auxiliary pointer record that includes a high-water-mark position indicator pertaining to the stream of second audit records and pointing to an audit record that should be among the second audit records.

4. The method of claim 3, wherein the second comparing comprises comparing the high-water-mark position indicator against an audit trail position indicator of the last one of the second audit records.

5. The method of claim 1, wherein the step of determining an undo set of transactions for which a commit/abort outcome is unknown and transactions for which the commit/abort outcome is known but for which the backup system has an incomplete set of audit records comprises:
    inspecting the received control records corresponding to a first time interval of operation on the primary system to determine which transactions are known to have committed or aborted, and generating a transaction status table of transactions known to have committed or aborted;
    inspecting the first audit records in a portion of the second image trails corresponding to the first time interval of operation in the primary system to determine any additional transactions that were active on the primary system during the first time interval and which are not known to have committed or aborted during the first time interval, and adding those additional transactions to the transaction status table;
    inspecting the second audit records in a portion of the third image trails corresponding to the first time interval of operation in the primary system to determine any additional transactions that were active on the primary system during the first time interval and which are not known to have committed or aborted during the first time interval, and adding those additional transaction to the transaction status table;
    identifying any transactions which are known to have committed or aborted but for which the second or third image trails of the backup system may have an incomplete set of audit records; and
    from the transaction status table generating an Undo List of transaction identifiers for the transactions determined to have been active on the primary system during the first time interval and which are not known to have committed or aborted during the first time interval and for the transactions which are known to have committed or aborted but for which the backup system may have an incomplete set of audit records.

6. The method of claim 5, wherein the step of undoing database updates includes undoing database updates for the transactions listed in the Undo List.

7. The method of claim 5, wherein the step of undoing database updates includes the steps of:
    determining a first Updater End Point for the first stream of first audit records;
    examining the first audit records having audit trail positions higher than the first Updater End Point to identify respective ones of the first audit records that are associated with the transactions identified in the Undo List; and
    backing out of the respective ones of the first audit records.

8. The method of claim 7, wherein the step of undoing database updates further includes the steps of:
    determining a second Updater End Point for the second stream of second audit records;
    examining the second audit records having a position higher than the second Updater End Point for respective ones of the second audit records that are associated with the transactions identified in the Undo List; and
    backing out of the respective ones of the second audit records.

9. A backup computer system for replicating database updates performed on a primary system, comprising:
    a master receiver for receiving a first stream of first audit records from the primary system, the stream of first audit records comprising first audit update records and first audit backout records pertaining to database transactions performed on the primary system, each of the first audit records including an audit trail position indicator unique to the first stream;
    an auxiliary receiver for receiving a second stream of second audit records from the primary system, the auxiliary audit trail comprising second audit update records and second audit backout records pertaining to the database transactions, each of the second audit records including an audit trail position indicator unique to the second stream;
    the stream of first audit records further comprising control records that have sufficient information to enable the backup system to determine, upon occurrence of a predetermined event, whether a commit/abort outcome for each of the database transactions is known and whether the audit update records and the audit backout records received by the backup system contain a complete set of audit records for each of the database transactions with known commit/abort outcomes;
    a master image trail for storing the control records;
    a first image trail associated with the stream of first audit records for storing the first audit update records and the first audit backout records;
    a second image trail associated with the stream of second audit records for storing the second audit update records and the second audit backout records;
    a first updater for sequentially applying to a backup database database updates and database backouts indicated by the first audit update records and first audit backout records in the first image trail, without regard to whether corresponding transactions in the primary system committed or aborted;
    a second updater for sequentially applying to the backup database database updates and database backouts indicated by the second audit update records and the second audit backout records in the second image trail, without regard to whether corresponding transactions in the primary system committed or aborted;

means for determining an undo set of transactions based on the control records and the first audit records and the second audit records, the undo set of transactions comprising transactions for which a commit/abort outcome is unknown and transactions for which the commit/abort outcome is known but for which the backup system comprises an incomplete set of audit records upon occurrence of the predefined event; and means for undoing database updates for the undo set of transactions upon occurrence of the predefined event.

10. The backup system of claim 9, wherein the means for determining comprises:

means for examining transaction identifiers contained in the control records to determine transactions for which a commit/abort outcome is known;

first means for comparing the transaction identifiers against transaction identifiers contained in the audit records of the second image trail and the third image trail to determine transactions for which the commit/abort outcome is unknown; and second means for comparing contents of the control records with an audit trail position of a last one of the second audit records to determine transactions for which the commit/abort outcome is known but for which the backup system comprises an incomplete set of audit records.

11. The backup system of claim 10, wherein control records comprise an auxiliary pointer record that includes a high-water-mark position indicator pertaining to the stream of second audit records and pointing to an audit record that should be among the second audit records.

12. The backup system of claim 11, wherein the second means for comparing comprises means for comparing the high-water-mark position indicator against an audit trail position indicator of the last one of the second audit records.

13. The backup system of claim 9, wherein the means for determining an undo set of transactions for which a commit/abort outcome is unknown and transactions for which the commit/abort outcome is known but for which the backup system has an incomplete set of audit records comprises:

means for inspecting the received control records corresponding to a first time interval of operation on the primary system to determine which transactions are known to have committed or aborted, and generating a transaction status table of transactions known to have committed or aborted;

means for inspecting the first audit records in a portion of the first image trails corresponding to the first time interval of operation in the primary system to determine any additional transactions that were active on the primary system during the first time interval and which are not known to have committed or aborted during the first time interval, and adding those transactions to the transaction status table;

means for inspecting the second audit records in a portion of the second image trails corresponding to the first time interval of operation in the primary system to determine any additional transactions that were active on the primary system during the first time interval and which are not known to have committed or aborted during the first time interval;

means for identifying any transactions which are known to have committed or aborted but for which the first or second image trails of the backup system may have an incomplete set of audit records; and means for generating an Undo List of transaction identifiers for the transactions determined to have been active on the primary system during the first time interval and which are not known to have committed or aborted during the first time interval and for the transactions which are known to have committed or aborted but for which the backup system may have an incomplete set of audit records.

14. The backup system of claim 13, wherein the means for undoing database updates includes means for undoing database updates for the transactions listed in the Undo List.

15. The backup system of claim 13, wherein the means for undoing database updates includes:

means for determining a first Updater End Point for the first stream of first audit records;

means for examining the first audit records having audit trail positions higher than the first Updater End Point to identify respective ones of the first audit records that are associated with the transactions identified in the Undo List; and means for backing out the respective ones of the first audit records.

16. The backup system of claim 15, wherein the step of undoing database updates further includes:

means for determining a second Updater End Point for one of the third image trails;

means for examining the second audit records having a position higher than the second Updater End Point to identify respective ones of the second audit records that are associated with the transactions identified in the Undo List; and means for backing out the respective ones of the second audit records.

* * * * *